(12) United States Patent
Williams

(10) Patent No.: US 7,055,091 B1
(45) Date of Patent: May 30, 2006

(54) SYSTEM AND METHOD FOR ESTABLISHING RELATIONSHIPS BETWEEN HYPERTEXT REFERENCE AND ELECTRONIC MAIL PROGRAM INCORPORATING THE SAME

(75) Inventor: Marvin L. Williams, Hickory Creek, TX (US)

(73) Assignee: Avaya Inc., Lincroft, NJ (US)

( * ) Notice: Subject to any disclaimer, the term of this patent is extended or adjusted under 35 U.S.C. 154(b) by 0 days.

(21) Appl. No.: 09/234,351

(22) Filed: Jan. 20, 1999

(51) Int. Cl.
*G06F 15/00* (2006.01)

(52) U.S. Cl. ...................... 715/500; 715/513; 709/206; 709/229

(58) Field of Classification Search ............. 707/301.1, 707/500.1, 503–530; 709/206, 207, 218, 709/229, 203; 715/501.1, 500.1, 503, 514, 715/500, 513, 526
See application file for complete search history.

(56) References Cited

U.S. PATENT DOCUMENTS

| | | | |
|---|---|---|---|
| 5,727,129 A * | 3/1998 | Barrett et al. .................. 706/10 |
| 5,790,793 A * | 8/1998 | Higley ........................ 709/218 |
| 5,937,160 A * | 8/1999 | Davis et al. ................ 709/203 |
| 5,960,429 A * | 9/1999 | Peercy et al. .................. 707/5 |
| 5,991,798 A * | 11/1999 | Ozaki et al. ............... 709/217 |
| 6,012,087 A * | 1/2000 | Freivald et al. ............. 709/218 |
| 6,029,164 A * | 2/2000 | Birrell et al. .................. 707/3 |
| 6,065,048 A * | 5/2000 | Higley ........................ 709/218 |
| 6,151,630 A * | 11/2000 | Williams ..................... 709/229 |
| 6,175,823 B1 * | 1/2001 | Van Dusen ................. 455/406 |
| 6,185,551 B1 * | 2/2001 | Birrell et al. .................. 707/3 |
| 6,192,407 B1 * | 2/2001 | Smith et al. ................ 709/229 |
| 6,209,027 B1 * | 3/2001 | Gibson ....................... 709/218 |
| 6,212,553 B1 * | 4/2001 | Lee et al. .................... 709/206 |
| 6,226,630 B1 * | 5/2001 | Billmers ........................ 707/3 |
| 6,240,445 B1 * | 5/2001 | Kumar et al. ............... 709/206 |
| 6,360,254 B1 * | 3/2002 | Linden et al. .............. 709/219 |
| 6,377,978 B1 * | 4/2002 | Nguyen ...................... 709/206 |
| 6,742,030 B1 * | 5/2004 | MacPhail .................... 709/224 |

OTHER PUBLICATIONS

Henning Schulzinne, "World Wide Web: Whence, Whither, What Next?", IEEE Network, 1996, page(s):10-17.*

Sven Guckes; "mutt and urlview", USENET Newsgroup; Feb. 20, 1998; XP002188427; compmail.misc'retrieved on Jan. 28, 2001.

Kumar et al.; "A SHAREd Web To Support Design Teams"; Proceedings of the Third Workshop on Enabling Technologies: Infrastructure for Collaborative Enterprises; Apr. 17-19, 1994; pp. 178-182; XP010099059; Morgantown, WV.

Montebello et al.: "Evolvable intelligent user interface for WWW Knowledge-Based Systems"; Proceedings of Ideas '98: International Database Engineering and Applications Symposium; Jul. 8-10, 1998; pp. 224-233; XP010294640; Cardiff, UK.

* cited by examiner

*Primary Examiner*—William Bashore
*Assistant Examiner*—Maikhanh Nguyen

(57) ABSTRACT

For use with an electronic mail (e-mail) program, a system for, and method of, establishing relationships between hypertext references contained in e-mail messages received by the e-mail program and an e-mail program containing the system or the method. In one embodiment, the system includes: (1) a message parser that locates hypertext references in first and second e-mail messages received by the e-mail program and (2) a message organizer that allows a user to choose to display the first and second e-mail messages in an order that is based on the hypertext references.

45 Claims, 8 Drawing Sheets

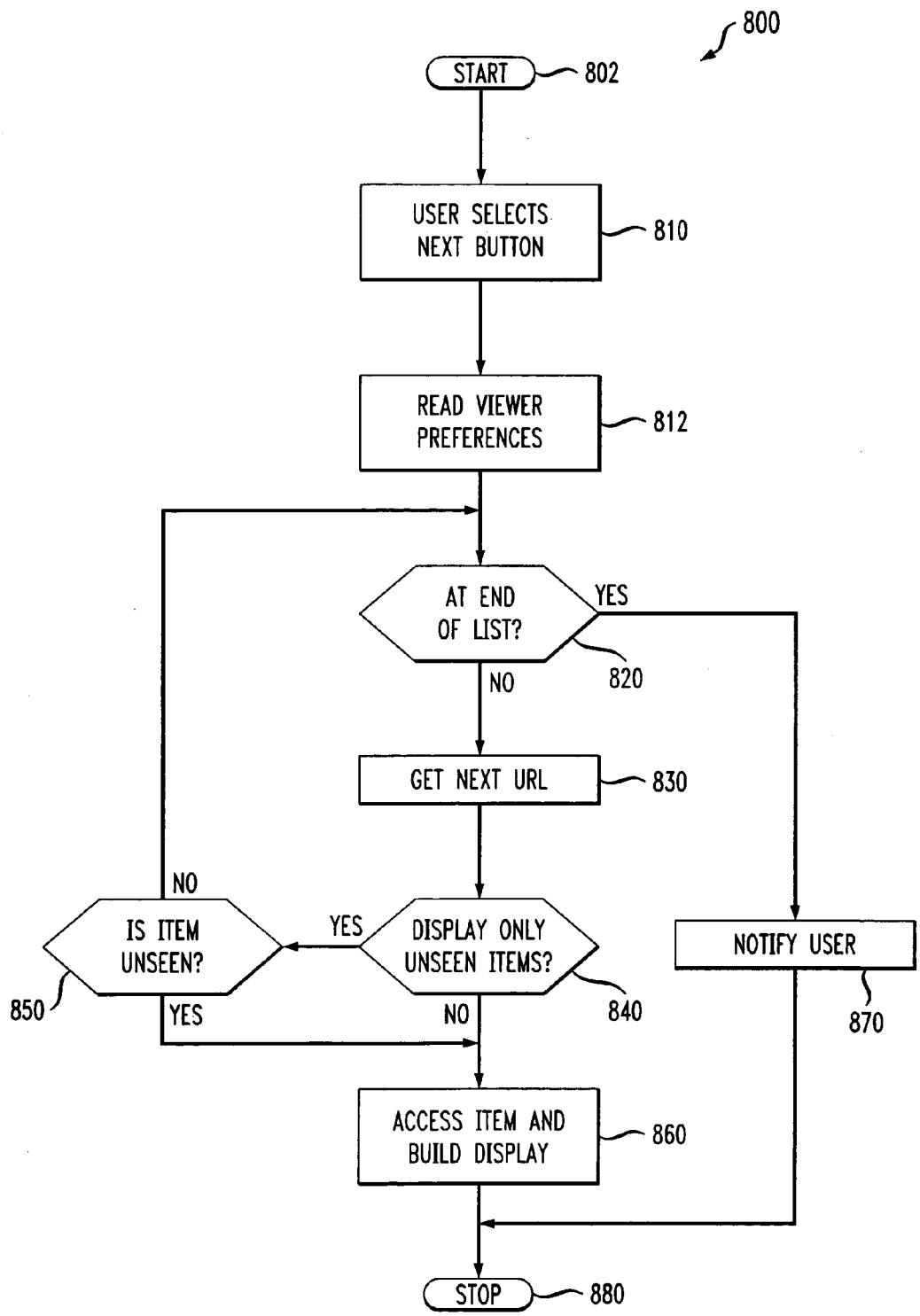

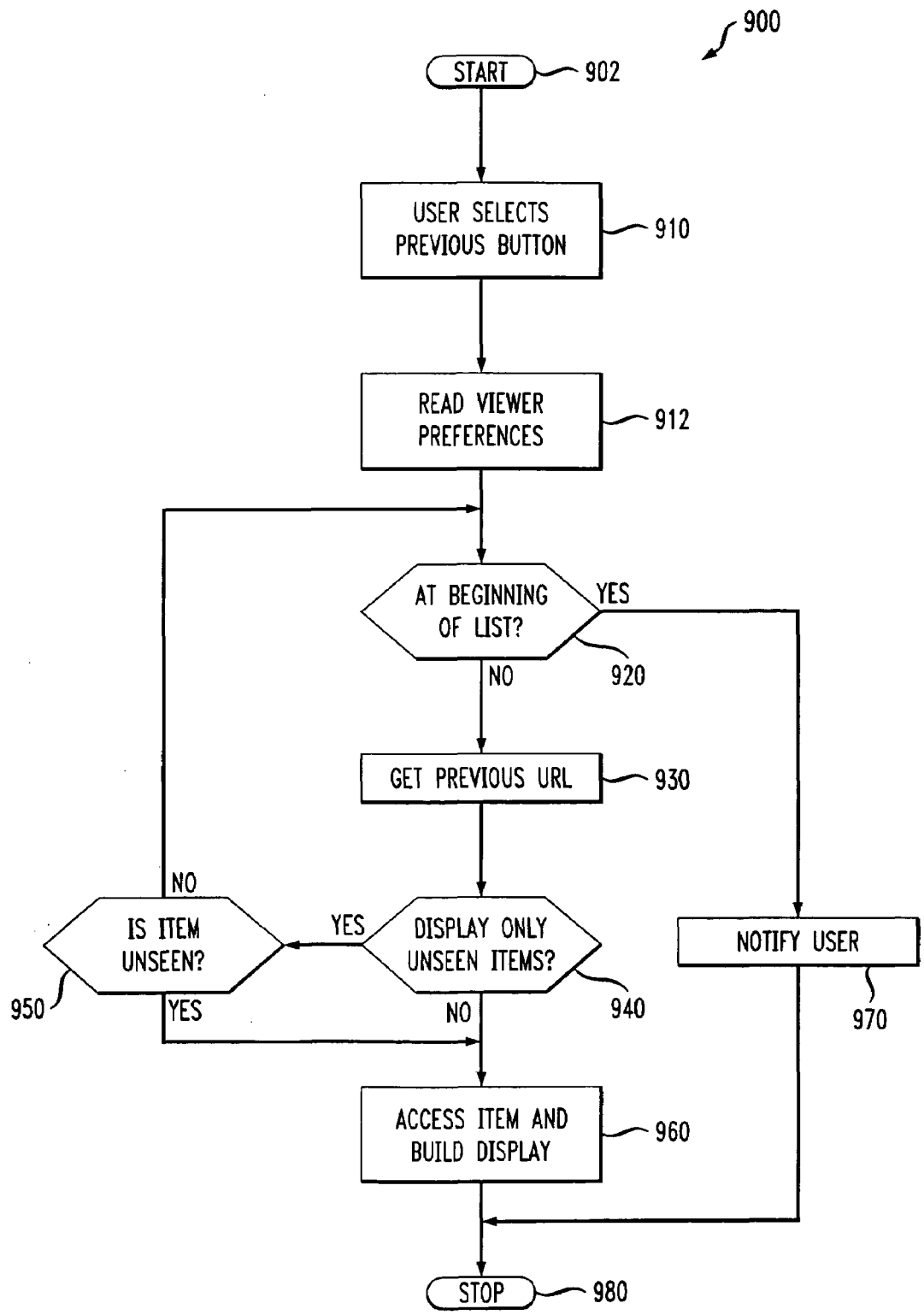

SYSTEM AND METHOD FOR ESTABLISHING RELATIONSHIPS BETWEEN HYPERTEXT REFERENCE AND ELECTRONIC MAIL PROGRAM INCORPORATING THE SAME

TECHNICAL FIELD OF THE INVENTION

The present invention is directed, in general, to computer networks and, more specifically, to a system and method for establishing relationships between hypertext references and a electronic mail program incorporating the same.

BACKGROUND OF THE INVENTION

Almost from their beginning, computer networks have allowed users to send electronic mail ("e-mail") messages to each other. The first e-mail programs only allowed textual messages to be sent from one user to another. Later-developed e-mail programs allowed users to send a single e-mail message to multiple users at a time. As the e-mail programs became further advanced, users could attach files to the e-mails they sent. E-mail messaging became significantly more valuable when the Internet came into wide use. The Internet allowed e-mail to be transmitted economically to anyone in the world connected to the Internet.

Among its many innovations, the Internet introduced a new language called Hypertext Markup Language ("HTML"). HTML provides a standardized method for constructing graphical displays that can be viewed on various types of computers. One of the features of HTML is hypertext itself. Hypertext is textual information that, when acted upon (selected), performs a special function, such as invoking other text or information.

With the advent of the Internet and HTML, users could send hypertext information to each other within their e-mail messages. One of the most common types of hypertext information sent in e-mail messages is a universal resource locator ("URL") address. The URL address is the location of a specific piece of associated information, such as a World Wide Web page. When the e-mail recipient selects the hypertext URL address contained in a given e-mail message, the e-mail recipient's Internet browser can automatically seek out and display the associated information.

As the popularity of the Internet has grown, there has been a corresponding increase in the incidence of e-mail messages containing multiple hypertext URL addresses. This has often resulted in recipients receiving multiple e-mail messages containing the same hypertext URL address. However, recipients have had difficulty tracking which of the hypertext URL addresses they have actually viewed.

To view the information associated with a hypertext URL address with current e-mail programs, the user must view the e-mail message and then select the hypertext URL address. The user's Internet browser is then activated to display the associated information. After the Internet browser has displayed the information associated with the hypertext URL address, the e-mail program designates the hypertext URL address as having been viewed (most often by changing textual color). Unfortunately, designation of hypertext URL addresses is not uniform as between multiple messages.

Another problem associated with displaying hypertext URL addresses contained within e-mail messages is that today's Internet browsers are indifferent to the order in which the e-mail message's URL addresses are presented. The Internet browsers display the URL address given to them. Once the web page is displayed, the user is limited to viewing the information defined by the author. However, the user cannot view the web page associated with the next e-mail message's hypertext URL address. What is needed in the art is a way to keep track of all the hypertext URL addresses received and a better way to view the web pages associated with each of the hypertext URL addresses.

SUMMARY OF THE INVENTION

To address the above-discussed deficiencies of the prior art, the present invention provides, for use with an e-mail program, a system for, and method of, establishing relationships between hypertext references contained in e-mail messages received by the e-mail program and an e-mail program containing the system or the method. In one embodiment, the system includes: (1) a message parser that locates hypertext references in first and second e-mail messages received by the e-mail program and (2) a message organizer that allows a user to choose to display the first and second e-mail messages in an order that is based on the hypertext references.

The present invention therefore introduces the broad concept of employing the hypertext references (or "links," such as, for example, Internet or Intranet URLs) that may be contained within e-mail messages to organize the messages or enhance viewing or navigation of resources (defined as units of information, such as sites or pages, designated by the hypertext references).

In one embodiment of the present invention, the message organizer further causes the e-mail program to display a message field containing the hypertext references. The field may be sorted in ascending or descending order to assist a user in reading the messages and viewing the hypertext references contained therein.

In one embodiment of the present invention, the first e-mail message is selected from the group consisting of: (1) a direct e-mail message and (2) a newsgroup posting. Thus, newsgroup postings are included within the broad scope of the present invention.

In one embodiment of the present invention, the hypertext references have associated viewing statuses. The message organizer identically marks viewing statuses of identical ones of the hypertext references. In other words, when a user views one of the hypertext references, the system can designate all identical hypertext references as having been viewed, thereby clarifying their state to the user so the user does not inadvertently review a previously-viewed resource.

In one embodiment of the present invention, the message parser parses the hypertext references to determine relationships therebetween. One hypertext reference may point to a resource that is subordinate to a resource to which another hypertext reference may point. The present invention can, in this embodiment, recognize a hierarchy of resources and therefore determine relationships between or among the resources.

In one embodiment of the present invention, the hypertext references are uniform resource locators (URLs). Those skilled in the pertinent art will recognize, however, that the present invention can be employed with any hypertext reference, URL or otherwise.

In one embodiment of the present invention, the message organizer allows the user to view referenced resources according to the order. Thus, the system can guide navigation through the referenced resources by allowing a user to move forwards or backwards through the ordered references.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 8 illustrates a flow diagram for processing the next button of the hypertext email relational browser of FIG. 5; and FIG. 9 illustrates a flow diagram for processing the previous button of the hypertext email relational browser of FIG. 5.

DETAILED DESCRIPTION

Figure 1:
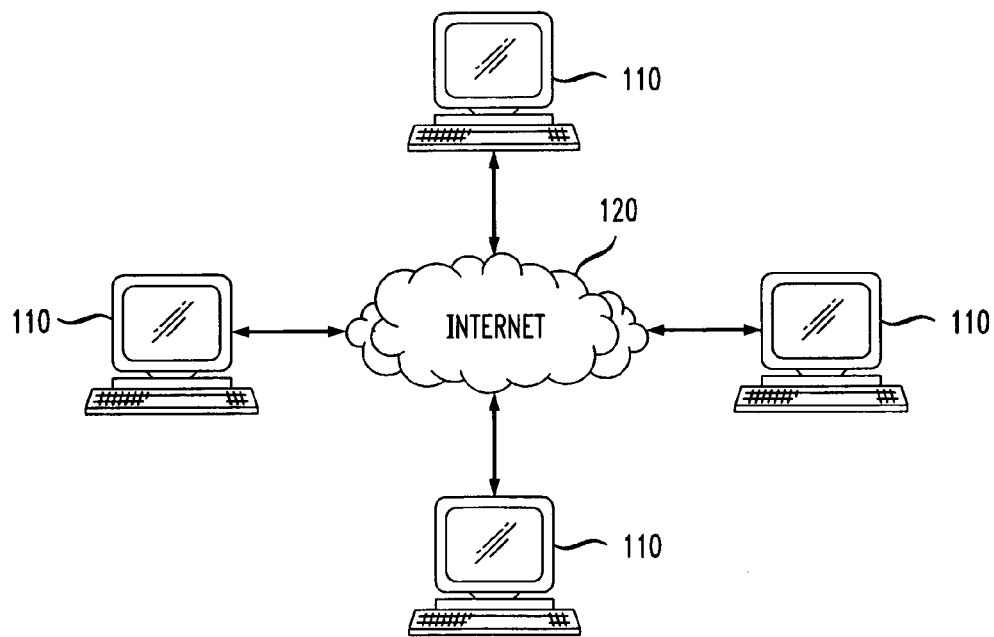
FIG. 1 illustrates a block diagram of one embodiment of a system for distributing, collecting and processing electronic mail over the Internet constructed according to the principles of the present invention.

Referring initially to FIG. 1, is a block diagram of one embodiment of a system for distributing, collecting and processing electronic mail over the Internet (one environment within which the present invention can function) constructed according to the principles of the present invention. The present invention comprises electronic mail communications terminals 110 and the Internet 120. Each of the electronic mail communications terminals 110 has a unique address associated with the Internet 120. Also, each of the electronic mail communications terminals 110 comprise programs capable of generating, receiving, processing and displaying electronic mail messages.

In one embodiment of the present invention, one of the electronic mail communications terminals 110 generates an electronic mail message ("e-mail") comprising a sender name and address, a receiver name and address, a subject, a message and other related information. The drafting electronic mail communications terminal 110 sends the e-mail to the Internet 120. The Internet 120 routes the e-mail to the one of the electronic mail communications terminals 110 specified in the receiver address field of the e-mail. The receiving electronic mail communications terminal 110 retrieves the e-mail from the Internet 120 and processes the e-mail.

Figure 2:
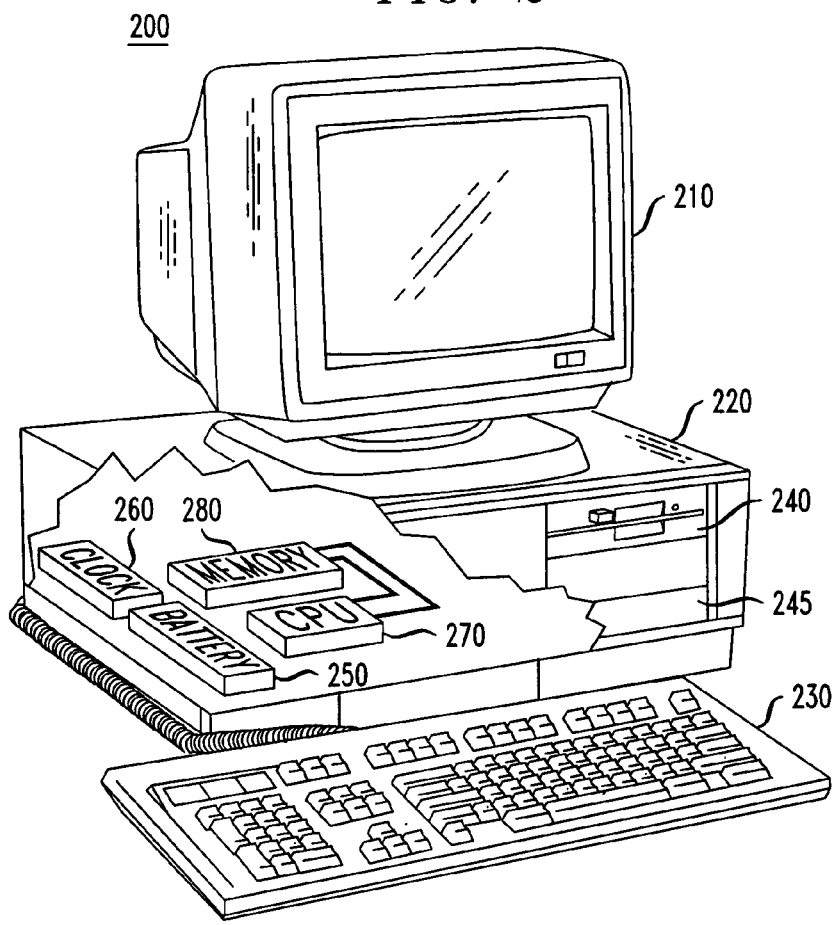
FIG. 2 illustrates an isometric view of a computer system operating as one of the electronic mail communications terminals of FIG. 1.

Turning now to FIG. 2, illustrated is an isometric view of a computer system 200 operating as one of the electronic mail communications terminals 110 of FIG. 1. The computer system 200 may be a conventional personal computer ("PC"). The e-mail communications terminal 110 need not be embodied in a computer system. Instead, the e-mail communications terminal 110 may take the form of a wireless terminal.

The computer system 200 includes a monitor 210, a chassis 220 and a keyboard 230. Alternatively, the monitor 210 and the keyboard 230 may be replaced by other conventional output and input devices, respectively. The chassis 220 includes both a floppy disk drive 240 and a hard disk drive 245. The floppy disk drive 240 is employed to receive, read and write to external disks; the hard disk drive 245 is employed for fast access storage and retrieval. The floppy disk drive 240 may be replaced by or combined with other conventional structures to receive and transmit data and instructions, including without limitation, tape and compact disc drives, telephony systems and devices (including videophone, paging and facsimile technologies), and serial and parallel ports.

The chassis 220 is illustrated having a cut-away portion that includes a battery 250, a clock 260, a central processing unit ("CPU") 270 and a memory storage device 280. The processing circuitry of the present invention may be embodied in the CPU 270 and the communications circuitry of the present invention may be embodied in the CPU 270 in combination with the memory storage device 280. Although the computer system 200 is illustrated having a single CPU 270, hard disk drive 245 and memory storage device 280, the computer system 200 may be equipped with a plurality of CPUs and peripheral devices.

It should be noted that any conventional computer system having at least one CPU that is suitable to function as an electronic mail communications terminal may be replaced, or be used in conjunction with, the computer system 200, including without limitation, videophones, telephones, televisions, sophisticated calculators, and hand-held, laptop/notebook, mini, mainframe and supercomputers, including RISC and parallel processing architectures, as well as within computer system network combinations. Conventional computer system architecture is more fully discussed in Computer Organization and Architecture, by William Stallings, MacMillan Publishing Co. (3rd ed. 1993) and incorporated herein by reference. Alternative computer system embodiments may be firmware-or hardware-based.

Figure 3:
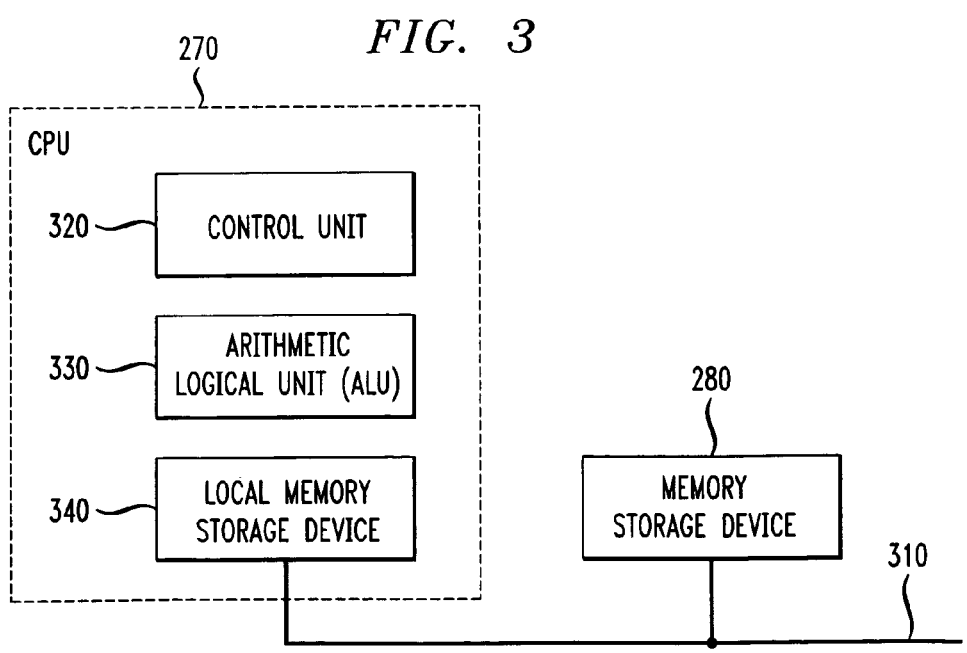
FIG. 3 illustrates a schematic block diagram of the CPU of FIG. 2 incorporating an embodiment of the present invention.

Turning now to FIG. 3, illustrated is a schematic block diagram of the CPU 270 of FIG. 2 incorporating an embodiment of the present invention. The CPU 270 is coupled to the memory storage device 280 by a data bus 310. The memory storage device 280 stores data and instructions that the CPU 270 uses to execute the functions necessary to operate the computer system 200. The memory storage device 280 may be any conventional memory storage device. The CPU 270 includes a control unit 320, an arithmetic logic unit ("ALU") 330 and a local memory storage device 340 (e.g., a stackable cache, a plurality of registers, etc.). The control unit 320 fetches the instructions from the memory storage device 280. The ALU 330, in turn, performs a plurality of operations, including addition and Boolean AND, necessary to carry out the instructions fetched from the memory storage device 280. The local memory storage device 340 provides a local high speed storage location for storing temporary results and control information generated and employed by the ALU 330. Again, the processing circuitry of the present invention is embodied in the CPU 270 and the e-mail communications and processing circuitry of the present invention may be embodied in the CPU 270 in combination with the memory storage device 280.

Figure 4:
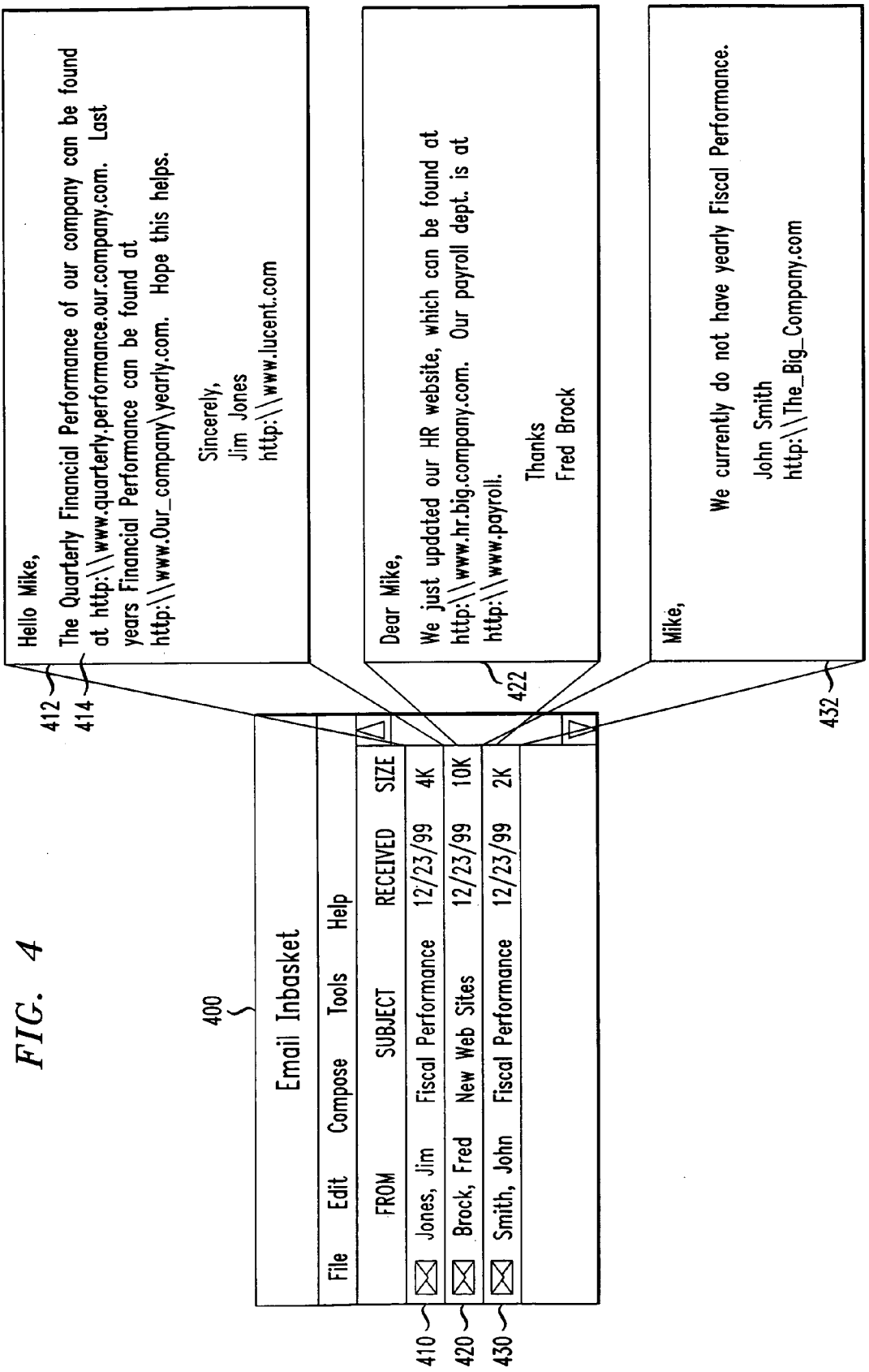
FIG. 4 illustrates a block diagram of an e-mail inbasket display for the computer system of FIG. 2.

Turning now to FIG. 4, illustrated is a block diagram of an e-mail inbasket display 400 for the computer system 200 of FIG. 2. The e-mail inbasket display 400 comprises an e-mail message A 410, an e-mail message B 420 and an e-mail message C 430. For each e-mail message, the e-mail inbasket display 400 shows an e-mail status, who the message is from, the subject of the e-mail message, the date received and the size of the e-mail message.

The contents of the e-mail for e-mail message A 410, e-mail message B 420 and e-mail message C 430 are shown in magnified cutouts 412, 422 and 432 respectively. Contained within the magnified cutout 412 for e-mail message A 410 is a universal resource locator ("URL") link 414. The URL link 414 is a hypertext link which allows a user to double click on the URL link 414 and the Internet web page associated with the URL link 414 will be displayed within the computer system 200's Internet browser.

In other embodiments of the present invention, the e-mail messages may contain one or more hypertext links or URL links. Also, the present invention is not limited to the e-mail inbasket display 400 illustrated in FIG. 4. Other e-mail programs may be used with the present invention.

Figure 5:
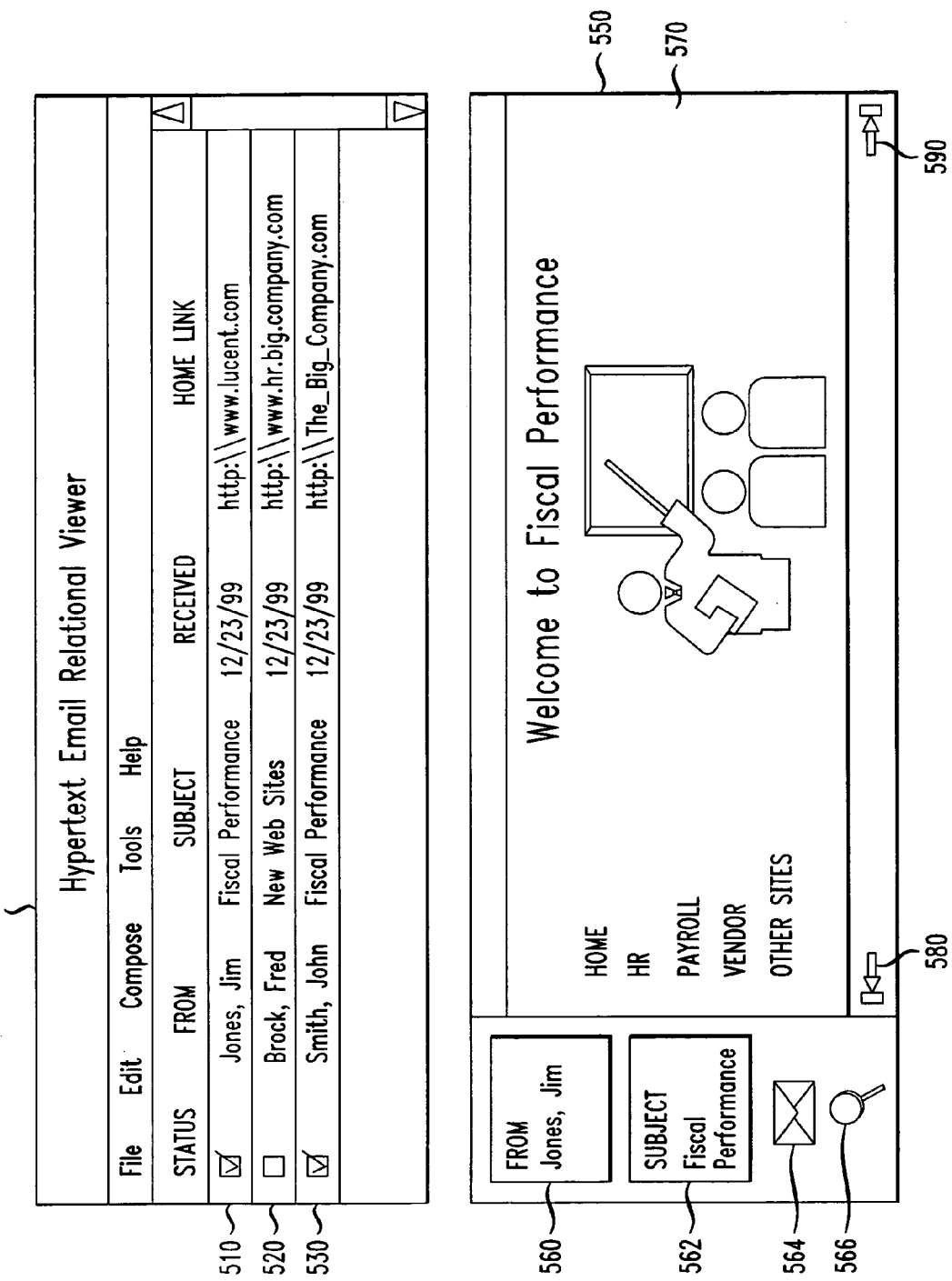
FIG. 5 illustrates a diagram of one embodiment of a hypertext email relational viewer constructed according to the principles of the present invention.

Turning now to FIG. 5, illustrated is a diagram of one embodiment of a hypertext email relational viewer 500 and a hypertext email relational browser 550 constructed according to the principles of the present invention. The hypertext email relational viewer 500 traverses the e-mail inbasket 400 and collects the unsolicited URL links 414 within e-mail messages. In another embodiment of the present invention, the unsolicited URL links 414 within e-mail messages are collected based upon a user profile. In a third embodiment of the present invention, the hypertext email relational viewer 500 collects unsolicited URL links from e-mail messages and newsgroup articles downloaded from the Internet.

The hypertext email relational viewer 500 comprises a hypertext message A 510, a hypertext message B 520 and a hypertext message C 530. For each hypertext message, the hypertext email relational viewer 500 displays a hypertext status, who the underlying e-mail message is from, the subject of the underlying e-mail message, the date the underlying e-mail message was received and a home link. The home link shows the URL links 414 found in the underlying e-mail message. In one embodiment of the present invention, the hypertext status displays if the home link is unviewed, viewed or invalid.

To display the hypertext email relational browser 550, the user double clicks on hypertext message A 510, hypertext message B 520 or hypertext message C 530. The hypertext email relational browser 550 comprises a from field 560, a subject field 562, an inbasket icon 564, an e-mail message icon 566, a current page display area 570, a previous button 580 and a next button 590.

The from field 560 displays the name of the person who sent the hypertext message's underlying e-mail message. This information is similar to what is displayed in the hypertext email relational viewer 500. The subject field 562 displays the subject of the hypertext message's underlying e-mail message. This information is similar to what is display in the subject field of the hypertext email relational viewer 500. The inbasket icon 564 allows the user to view the e-mail inbasket entry associated with the displayed hypertext message. The e-mail message icon 566 allows the user to see the contents of the hypertext message's underlying e-mail message such as what is displayed in the magnified cutouts 412, 422 and 432 of FIG. 4.

Once a user double clicks on a hypertext message in the hypertext email relational viewer 500, the hypertext email relational browser 550 displays the web page associated with the hypertext message's home link in the current page display area 570. The hypertext email relational browser 550 also incorporates viewer centric viewing instead of author centric viewing.

In viewer centric viewing, the user defines the next and previous web page content. In author centric viewing, the author of the web page defines the next and previous web page content. One embodiment of the present invention, the next and previous web page is defined by the order in which the hypertext messages are arranged in the hypertext email relational viewer. In another embodiment of the present invention, the user can determine the order of next and previous web pages. For example, the user could select to view only the unviewed home link web pages.

To view the next hypertext message's home link web page, the user clicks on the next button 590. To view the previous hypertext message's home link web page, the user clicks on the previous button 580. The user may progress forward or backwards in the hypertext message list until the user reaches the end of list in that direction.

One skilled in the art should know that the hypertext email relational viewer 500 is not limited to 3 hypertext messages. In other embodiments of the present invention, the hypertext email relational viewer 500 and the hypertext email relational browser 550 may contain additional or fewer functions than described.

Figure 6:
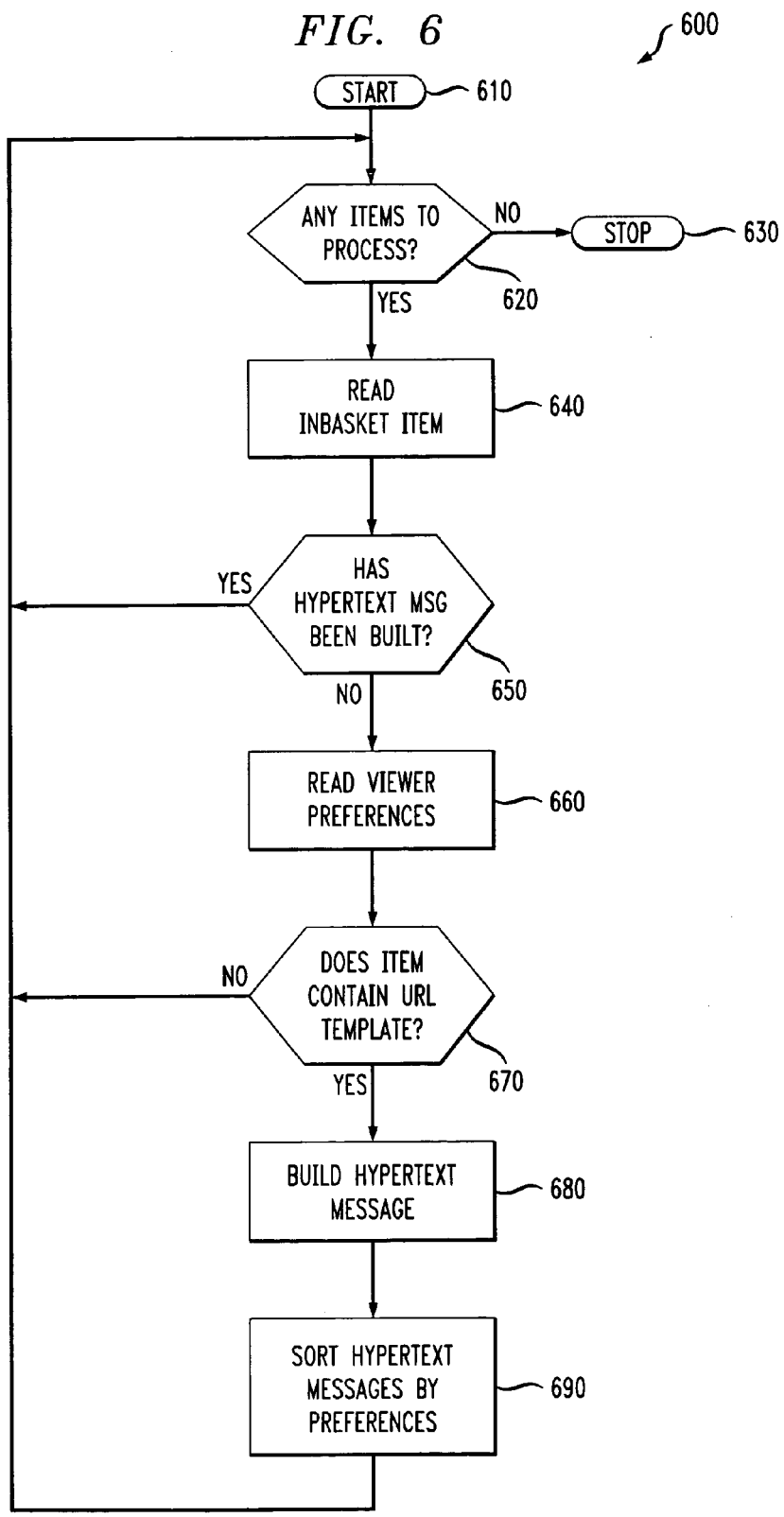
FIG. 6 illustrates a flow diagram for collecting the hypertext messages for the hypertext email relational viewer of FIG. 5.

Turning now to FIG. 6, illustrated is a flow diagram for collecting the hypertext messages for the hypertext email relational viewer 500 of FIG. 5. In FIG. 6, the hypertext email relational viewer 500 first performs initialization and starts the collection process in a step 610.

After initialization, the hypertext email relational viewer 500 determines if there are any e-mail messages to process in a decisional step 620. If there are no more e-mail messages to process, the hypertext email relational viewer 500 stops processing in a step 630.

If there are e-mail messages to process, the hypertext email relational viewer 500 reads the e-mail message from the e-mail inbasket 400 in a step 640. Next, the hypertext email relational viewer 500 determines if a hypertext message has been built for this e-mail message in a decisional step 650.

If a hypertext message has been built, the hypertext email relational viewer 500 determines if there are more e-mail messages to process in the decisional step 620. If a hypertext message has not been built, the hypertext email relational viewer 500 reads the viewer preferences in a step 660. In one embodiment of the present invention, the viewer preferences comprise e-mail message attributes such as date, time, subject, from, to, seen and unseen.

Next, the hypertext email relational viewer 500 determines if the e-mail message contains a universal resource locator ("URL") template in a decisional step 670. A URL template is a group of characters that signal the start of a URL address. For example, in one embodiment of the present invention, a URL template may comprise "http://www."

If the e-mail message does not contain a URL template, the hypertext email relational viewer 500 determines if there are more e-mail messages to process in the decisional step 620. If the e-mail message does contain a URL template, the hypertext email relational viewer 500 extracts the complete URL address and builds a hypertext message from the e-mail message in a step 680.

Next, the hypertext email relational viewer 500 sorts the hypertext messages according the viewer preferences in a step 690. The hypertext email relational viewer 500 then determines if there are more e-mail messages to process in the decisional step 620.

One skilled in the art should know that the present invention is not limited to URL addresses in e-mail messages. In another embodiment of the present invention, the hypertext email relational viewer 500 may extract URL addresses from e-mail messages and newsgroup articles downloaded from the Internet. Other embodiments of the present invention may have additional or fewer steps than described above.

Figure 7:
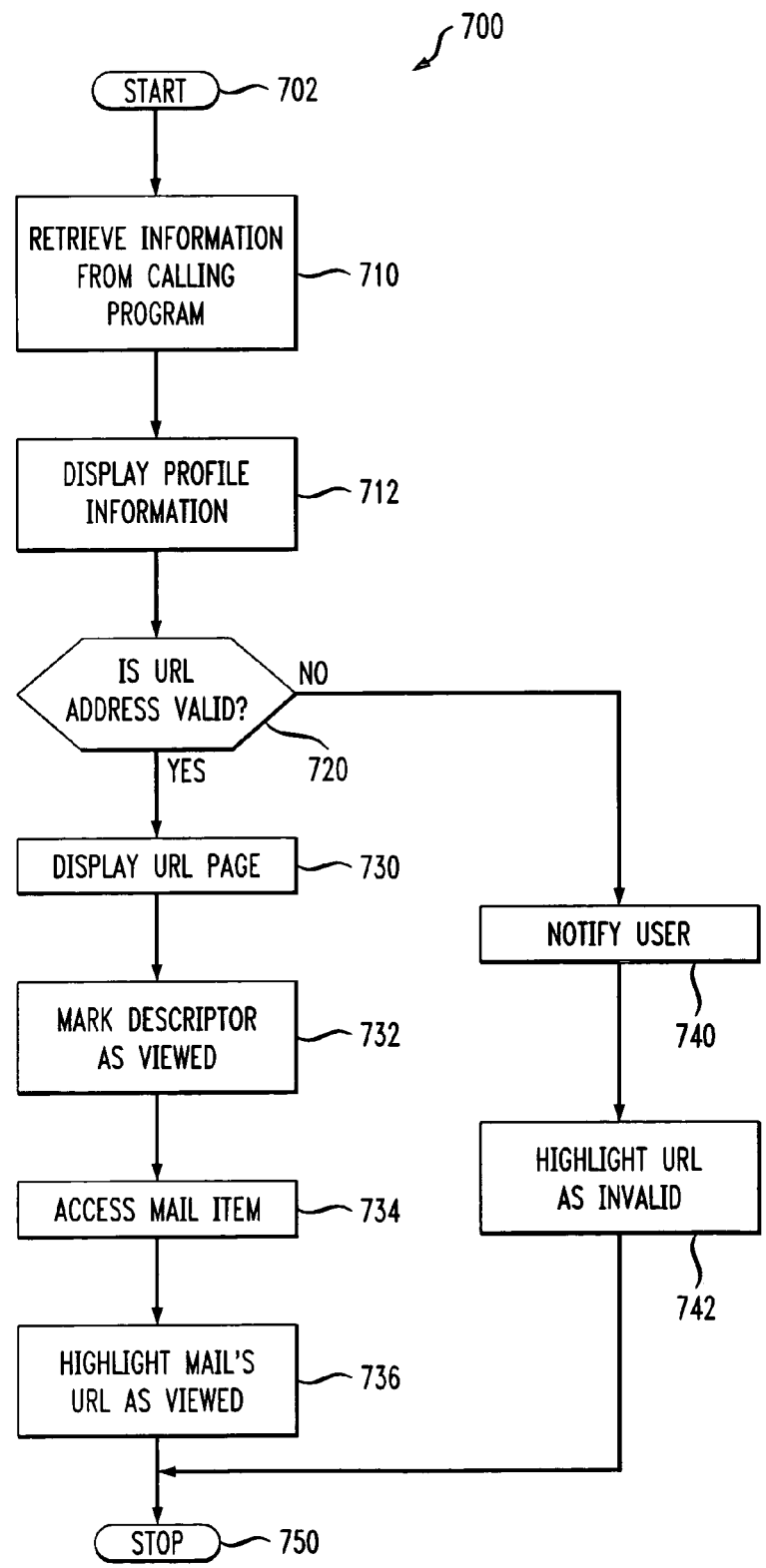
FIG. 7 illustrates a flow diagram for building the hypertext email relational browser of FIG. 5.

Turning now to FIG. 7, illustrated is a flow diagram for building the hypertext email relational browser 550 of FIG. 5. In FIG. 7, the hypertext email relational browser 550 first performs initialization and starts the display building process in a step 702.

After initialization, the hypertext email relational browser 550 retrieves the hypertext message information to be displayed from the calling program in a step 710. Next, the hypertext email relational browser 550 displays the hypertext message's information in the from field 560, the subject field 562, the inbasket icon 564 and the e-mail message icon 566.

The hypertext email relational browser 550 determines if the hypertext message's URL address is valid in a decisional step 720. In determining if the URL address is valid, the hypertext email relational browser 550 accesses the Internet and issues transmission control protocol/Internet protocol ("TCP/IP") commands to validate the URL address.

If the URL address is not valid, the hypertext email relational browser 550 notifies the user that the URL address is invalid in a step 740. The hypertext email relational browser 550 then highlights the URL address in the hypertext email relational viewer 500 as invalid in a step 742. Next, the hypertext email relational browser 550 stops processing in a step 750.

If the URL address is valid, the hypertext email relational browser 550 retrieves the web page associated with the URL address from the Internet and displays the web page in the current page display area 570 in a step 730. Next, the hypertext email relational browser 550 marks the hypertext message's URL address descriptor as viewed in a step 732.

The hypertext email relational browser 550 accesses the hypertext message's underlying e-mail message within the e-mail inbasket 400 in a step 734. Next, the hypertext email relational browser 550 highlights the URL address within the e-mail message as viewed in a step 736. In another embodiment of the present invention, the hypertext email relational browser 550 highlights the URL addresses in all of the hypertext messages and e-mail messages that contain the same URL address. The hypertext email relational browser then stops processing in the step 750.

One skilled in the art should understand that the present invention is not limited to URL addresses in e-mail messages. In another embodiment of the present invention, the hypertext email relational browser 550 may access and highlight URL addresses contained within e-mail messages and newsgroup articles downloaded from the Internet. Other embodiments of the present invention may have additional or fewer steps than described above.

Turning now to FIG. 8, illustrated is a flow diagram for processing the next button 590 of the hypertext email relational browser 550 of FIG. 5. In FIG. 8, the hypertext email relational browser 550 first performs initialization and starts the next button processing in a step 802.

After initialization, the hypertext email relational browser 550 waits for the user to select the next button 590 in a step 810. Once the user selects the next button 590, the hypertext email relational browser 550 reads the viewer preferences in a step 812.

The hypertext email relational browser 550 determines if there are more hypertext messages in the hypertext email relational viewer's list in a decisional step 820. If the hypertext email relational browser 550 is at the end of the list, the hypertext email relational browser 550 notifies the user of this condition in a step 870. Then the hypertext email relational browser 550 stops processing the next button request in a step 880. In another embodiment of the present invention, if hypertext email relational browser 550 is at the end of the list, the hypertext email relational browser 550 restarts the process at the beginning of the list.

If the hypertext email relational browser 550 is not at the end of the list, the hypertext email relational browser 550 reads the next hypertext message in the hypertext email relational viewer's list and obtains the associated URL address in a step 830. Next, the hypertext email relational browser 550 examines the viewer preferences and determines if the hypertext email relational browser 550 is to display only unseen URL addresses in a decisional step 840.

If the hypertext email relational browser 550 is to display only unseen URL addresses, the hypertext email relational browser 550 determines if the URL address for this hypertext message is unseen in a decisional step 850. If the URL address has been seen, the hypertext email relational browser 550 will process the next hypertext message if the hypertext email relational browser 550 is not at the end of the list in the decisional step 820.

If the URL address is unseen or if the hypertext email relational browser 550 is to process all URL addresses, then the hypertext email relational browser 550 accesses the hypertext message and builds the display according to the process described in the flow diagram of FIG. 7 in a step 860. The hypertext email relational browser 550 then stops processing the next button request in the step 880.

One skilled in the art should know that the present invention is not limited to only viewing URL addresses that have been seen or unseen. Other embodiments of the present invention may have additional or fewer steps than described above.

Turning now to FIG. 9, illustrated is a flow diagram for processing the previous button 580 of the hypertext email relational browser 550 of FIG. 5. In FIG. 9, the hypertext email relational browser 550 first performs initialization and starts the next button processing in a step 902.

After initialization, the hypertext email relational browser 550 waits for the user to select the previous button 580 in a step 910. Once the user selects the previous button 580, the hypertext email relational browser 550 reads the viewer preferences in a step 912.

The hypertext email relational browser 550 determines if there are more hypertext messages in the hypertext email relational viewer's list in a decisional step 920. If the hypertext email relational browser 550 is at the beginning of the list, the hypertext email relational browser 550 notifies the user of this condition in a step 970. Then the hypertext email relational browser 550 stops processing the previous button request in a step 980. In another embodiment of the present invention, if hypertext email relational browser 550 is at the beginning of the list, the hypertext email relational browser 550 restarts the process at the end of the list.

If the hypertext email relational browser 550 is not at the beginning of the list, the hypertext email relational browser 550 reads the previous hypertext message in the hypertext email relational viewer's list and obtains the associated URL address in a step 930. Next, the hypertext email relational browser 550 examines the viewer preferences and determines if the hypertext email relational browser 550 is to display only unseen URL addresses in a decisional step 940.

If the hypertext email relational browser 550 is to display only unseen URL addresses, the hypertext email relational browser 550 determines if the URL address for this hypertext message is unseen in a decisional step 950. If the URL address has been seen, the hypertext email relational browser 550 will process the previous hypertext message if the hypertext email relational browser 550 is not at the beginning of the list in the decisional step 920.

If the URL address is unseen, or if the hypertext email relational browser 550 is to process all URL addresses, then the hypertext email relational browser 550 accesses the hypertext message and builds the display according to the process described in the flow diagram of FIG. 7 in a step 960. The hypertext email relational browser 550 then stops processing the previous button request in the step 980.

One skilled in the art should know that the present invention is not limited to only viewing URL addresses that have been seen or unseen. Other embodiments of the present invention may have additional or fewer steps than described above.

From the above, it is apparent that the present invention provides, for use with an e-mail program, a system for, and method of, establishing relationships between hypertext references contained in e-mail messages received by the e-mail program and an e-mail program containing the system or the method. In one embodiment, the system includes: (1) a message parser that locates hypertext references in first and second e-mail messages received by the e-mail program and (2) a message organizer that allows a user to choose to display the first and second e-mail messages in an order that is based on the hypertext references.

Although the present invention has been described in detail, those skilled in the art should understand that they can make various changes, substitutions and alterations herein without departing from the spirit and scope of the invention in its broadest form.

What is claimed is:

1. For use with an electronic mail program, an arrangement comprising:
 a message parser that locates hypertext references in a plurality of electronic mail messages;
 a message organizer that orders the located hypertext references in an order predetermined by a preference of a user;
 means responsive to a first command from the user, for displaying a first web page corresponding to one of the located hypertext references; and
 means responsive to a next command issued by the user while the first web page is displayed, wherein the next command does not identify an electronic mail message or a hypertext reference, for displaying a second web page corresponding to another of the located hypertext references that is next in the predetermined order, without displaying the electronic mail message in which the other hypertext reference is located.

2. The arrangement as recited in claim 1 wherein said message organizer further causes said electronic mail program to display a message field containing said hypertext references and a from field containing said sender associated with each of said hypertext references.

3. The arrangement as recited in claim 1 wherein said electronic mail messages are each selected from the group consisting of:
 a direct electronic mail message, and
 a newsgroup posting.

4. The arrangement as recited in claim 1 wherein said hypertext references have associated viewing statuses, said message organizer identically marking viewing statuses of identical ones of said hypertext references.

5. The arrangement as recited in claim 1 wherein said message organizer orders based on said hypertext references and said sender associated with each of said hypertext references.

6. The arrangement as recited in claim 1 wherein said hypertext references are uniform resource locators (URLs).

7. The arrangement as recited in claim 1 further comprising a browser and wherein said message organizer is capable of employing said browser to view information associated with said hypertext references.

8. The arrangement as recited in claim 7 wherein said browser is capable of paging between pages of information associated with said hypertext references of said message organizer and said browser identically marks viewing statuses of identical ones of said hypertext references.

9. The arrangement of claim 1 wherein:
 the means for displaying a second web page comprise a button displayed along with the first web page whose actuation triggers displaying of the second web page.

10. The arrangement of claim 1 wherein:
 the means for displaying a second web page are further responsive to another command issued by the user while the first web page is displayed, wherein the other command does not identify an electronic mail message or a hypertext reference, for displaying a third web page corresponding to a preceding one of the hypertext references in the predetermined order, without displaying the electronic message in which such other hypertext reference is located.

11. The arrangement of claim 10 wherein:
 the means for displaying a second web page comprise a button displayed along with the first web page whose actuation triggers displaying of the second web page.

12. The arrangement of claim 1 wherein:
 the means for displaying a second web page are further responsive to another command issued by the user while the second web page is displayed, wherein the other command does not identify an electronic mail message or a hypertext reference, for displaying a third web page corresponding to yet another of the located hypertext references in the predetermined order that follows or precedes the hypertext reference to the first web page, without displaying the electronic mail message in which the hypertext reference to the third web page is located.

13. The arrangement of claim 12 wherein:
 the means for displaying a second web page comprise a first button displayed along with the first web page whose actuation triggers displaying of the web page corresponding to the hypertext reference that follows the one hypertext reference in the order, and a second button displayed along with the first web page whose actuation triggers displaying of the web page corresponding to the hypertext reference that precedes the one hypertext reference in the order.

14. The arrangement of claim 1 further comprising:

means responsive to displaying of the first web page, for marking all hypertext references corresponding to the first web page in the electronic mail messages as having been accessed.

15. The arrangement of claim 1 wherein:

the message organizer responds to displaying of the first web page by deleting the hypertext reference corresponding to the first web page from the order.

16. The arrangement of claim 1 further comprising:

means responsive to the locating, for displaying a list of the electronic mail messages, including displaying in the list each located hypertext reference in association with an identifier of the electronic mail message in which the located hypertext reference is found.

17. For use with an electronic mail program, a method comprising:

locating hypertext references in a plurality of electronic mail messages;

in response to a first command from a user, displaying a first web page corresponding to one of the located hypertext references; and in response to a next command issued by the user while the first web page is displayed, wherein the next command does not identify an electronic mail message or a hypertext reference, displaying a second web page corresponding to another of the located hypertext references that is next in relation to the hypertext reference to the first web page in an order of the located hypertext references predetermined by a preference of the user, without displaying the electronic mail message in which the hypertext reference to the second web page is located.

18. The method as recited in claim 17 further comprising causing said electronic mail program to display a message field containing said hypertext references and a from field containing said sender associated with each of said hypertext references.

19. The method as recited in claim 17 wherein said electronic mail messages are selected from the group consisting of:

a direct electronic mail message, and a newsgroup posting.

20. The method as recited in claim 17 wherein said hypertext references have associated viewing statuses, said method comprising identically marking viewing statuses of identical ones of said hypertext references.

21. The method as recited in claim 17 wherein said order is based on said hypertext references and said sender associated with each of said hypertext references.

22. The method as recited in claim 17 wherein said hypertext references are uniform resource locators (URLs).

23. The method as recited in claim 17 further comprising invoking a browser to view information associated with said hypertext references.

24. The method of claim 17 further comprising:

in response to another command issued by the user while the first web page is displayed, wherein the another command does not identify an electronic mail message or a hypertext reference, displaying a third web page corresponding to yet another of the located hypertext references that precedes the hypertext reference of the first web page in the order, without displaying the electronic message in which the hypertext reference to the third web page is located.

25. The method of claim 17 further comprising:

in response to another command issued by the user while the second web page is displayed and wherein the other command does not identify an electronic mail message or a hypertext reference, displaying a third web page corresponding to yet another of the located hypertext references that follows or precedes the hypertext reference of the first web page in the order, without displaying the electronic mail message in which the hypertext reference to the third web page is located.

26. The method of claim 17 further comprising:

in response to displaying the first web page, marking all hypertext references corresponding to the first web page in the electronic mail messages as having been accessed.

27. The method of claim 17 further comprising:

in response to displaying the first web page, deleting the hypertext reference corresponding to the first web page from the order.

28. The method of claim 17 further comprising:

in response to the locating, displaying a list of the electronic mail messages, including displaying in the list each located hypertext reference in association with an identifier of the electronic mail message in which the located hypertext reference is found.

29. An electronic mail program, comprising:

a message receiver;

a message transmitter coupled to said message receiver;

a message composer coupled to said message transmitter;

a message store coupled to said message composer;

a message parser that locates hypertext references in a plurality of electronic mail messages received by said message receiver;

a message organizer that orders the located hypertext references in an order predetermined by a preference of a user; and a message displayer that responds to a first command from the user by displaying a first web page corresponding to one of the located hypertext references, and that responds to a next command issued by the user while the first web page is displayed, wherein the next command does not identify an electronic mail message or a hypertext reference, by displaying a second web page corresponding to another of the located hypertext references that is next in the predetermined order, without displaying the electronic mail message in which the hypertext reference to the second web page is located.

30. The method as recited in claim 29 further comprising:

paging between pages of information associated with said hypertext references of said message organizer; and identically marking viewing statuses of identical ones of said hypertext references.

31. The electronic mail program as recited in claim 29 wherein said message organizer further causes said electronic mail program to display a message field containing said hypertext references and a from field containing said sender associated with each of said hypertext references.

32. The electronic mail program as recited in claim 29 wherein said is electronic mail messages are selected from the group consisting of:

a direct electronic mail message, and a newsgroup posting.

33. The electronic mail program as recited in claim 29 wherein said hypertext references have associated viewing statuses, said message organizer identically marking viewing statuses of identical ones of said hypertext references.

34. The electronic mail program as recited in claim 29 wherein said message organizer orders based on said hypertext references and said sender associated with each of said hypertext references.

35. The electronic mail program as recited in claim 29 wherein said hypertext references are uniform resource locators (URLs).

36. The electronic mail program as recited in claim 29 further comprising a browser and wherein said message organizer is capable of employing said browser to view information associated with said hypertext references.

37. The electronic mail program as recited in claim 36 wherein said browser is capable of paging between pages of information associated with said hypertext references of said message organizer and said browser identically marks viewing statuses of identical ones of said hypertext references.

38. The program of claim 29 wherein:
the message displayer comprises
a button displayed along with the first web page whose actuation triggers displaying of the second web page.

39. The program of claim 29 wherein:
the message displayer further responds to another command issued by the user while the first web page is displayed and wherein the other command does not identify an electronic mail message or a hypertext reference, by displaying a third web page corresponding to yet another of the hypertext references in the predetermined order that precedes the hypertext reference to the first web page, without displaying the electronic message in which the hypertext reference to the third web page is located.

40. The program of claim 39 wherein:
the message displayer comprises
a button displayed along with the first web page whose actuation triggers displaying of the second web page.

41. The program of claim 39 wherein:
the message displayer further responds to another command issued by the user while the second web page is displayed and wherein the other command does not identify an electronic mail message or a hypertext reference, by displaying a third web page corresponding to yet another of the hypertext references that follows or precedes the hypertext reference to the first web page, without displaying the electronic mail message in which the hypertext reference to the third web page is located.

42. The program of claim 41 wherein:
the message displayer comprises
a first button displayed along with the first web page whose actuation triggers displaying of the web page corresponding to the hypertext reference that follows the one hypertext reference in the order, and
a second button displayed along with the first web page whose actuation triggers displaying of the web page corresponding to the hypertext reference that precedes the one hypertext reference in the order.

43. The program of claim 29 wherein:
the message displayer responds to displaying of the first web page by marking all hypertext references corresponding to the first web page in the electronic mail messages as having been accessed.

44. The program of claim 29 wherein:
the message organizer responds to displaying of the first web page by deleting the hypertext reference corresponding to the first web page from the order.

45. The program of claim 29 wherein:
the message displayer responds to the locating by displaying a list of the electronic mail messages, including displaying in the list each located hypertext reference in association with an identifier of the electronic mail message in which the located hypertext reference is found.

* * * * *